United States Patent [19]

Simmons et al.

[11] 4,395,068

[45] Jul. 26, 1983

[54] STATIC LINE RETRIEVAL APPARATUS

[75] Inventors: Gerald C. Simmons, Bothell; Noel E. Hilby, Maple Valley, both of Wash.

[73] Assignee: The Boeing Company, Seattle, Wash.

[21] Appl. No.: 237,025

[22] Filed: Feb. 23, 1981

[51] Int. Cl.³ .............................................. B66C 1/14
[52] U.S. Cl. .............................. 294/78 R; 244/151 B
[58] Field of Search ............... 294/78 R, 83 R, 83 A, 294/83 AA, 83 AB, 74, 75, 89; 244/151 R, 151 B, 151 A, 137 R, 138 R

[56] References Cited

U.S. PATENT DOCUMENTS 4,019,770  4/1977  Poelma et al. ................... 294/78 R
4,303,213  12/1981  Bolender et al. ............... 244/151 B Primary Examiner—James B. Marbert
Attorney, Agent, or Firm—Ronald E. Suter; Bernard A. Donahue; Randall M. Heald

[57] ABSTRACT

A which cable driven retrieval apparatus for retracting static lines slidably mounted on a fixed anchor cable or the like, wherein a retrieval spool is slidably mounted on the anchor cable and is attached to a winch cable through a pair of attachment members extending from opposite sides of the spool. The points of attachment are carefully chosen such that an imaginary line extending therebetween intersects the anchor cable and preferably the centerline of the anchor cable.

9 Claims, 4 Drawing Figures

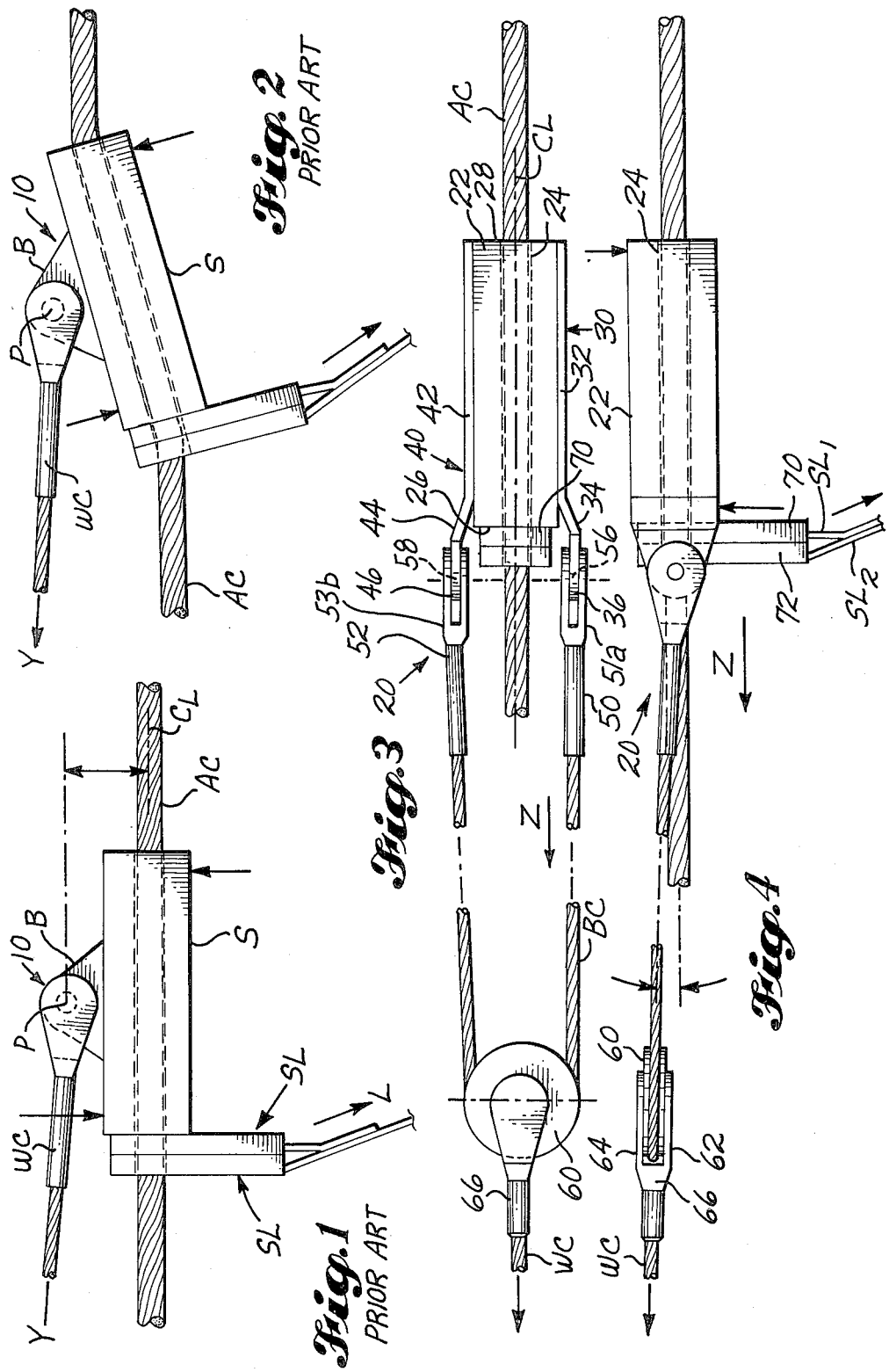

STATIC LINE RETRIEVAL APPARATUS

DESCRIPTION

1. Technical Field

The present invention relates to an improved static line retrieval apparatus for use in retracting one or more static lines upon completion of an air drop.

2. Background Art

The present invention provides an improved apparatus for retracting one or more cable mounted static lines upon completion of an air drop.

Static lines employed to initiate opening of attached parachutes are often slidably mounted on a common anchor cable secured within the aircraft. The parachutes are attached to cargo and/or personnel designated to be dropped from the aircraft. As each piece of cargo and its attached parachute leaves the aircraft, a static line attached to the parachute slides as far as possible along the common anchor line prior to opening the attached parachute. After the drop has been completed, the static lines usually dangle together from the aircraft. For various reasons, including the safety of the crew as well as of the aircraft itself, it is considered highly desirable to withdraw or retract the dangling static lines as quickly as possible after completion of the air drop.

Various devices have been suggested for retracting static lines along their common anchor cable. In many known arrangements, the retrieval system consists of winch-drawn retrieval spools slidably mounted on the anchor cable. Usually the retrieval spool is attached to an electrically-driven winch or the like through a conventional winch cable assembly. Upon activation of the winch, the retrieval spool is drawn along the anchor cable by the winch cable assembly. As the spool is drawn along the cable it contacts and hopefully pushes the static lines along the anchor cable toward their retracted positions.

While such winch-driven retrieval spool assemblies would appear to provide a solution to the problem of static line retraction, known retrieval assemblies have generally proven less than completely satisfactory. A major problem in such retrieval assemblies is a tendency for the retriever spool to overturn on its anchor cable when contacting heavily loaded static lines. As the spool attempts to pivot or overturn, it creates kinks in the anchor cable which make sliding movement of the spool difficult, if not impossible. Furthermore, failure of the retrieval winch pulling spool and/or the anchor cable itself have been known to occur as a result of kinks developing in the anchor cable which block sliding movement of the spool.

Upon careful study, it has been discovered that a cause of spool overturn resides in the fact that the point of attachment between the winch cable and the spool is offset in a lateral direction from the center line of the anchor cable. Because of the offset, pulling forces generated by the winch cable tend to pivot or overturn the spool. This pivoting movement of the spool usualy occurs as the spool contacts heavily loaded static lines, resulting in the pivoting spool forming kinks in the anchor cable. The existance of such a vertical offset provides an explanation for why a known spool mounted on an anchor cable having excess slack actually kinked the anchor cable 90° as the stool attempted to retract heavily loaded static lines slidably mounted on the anchor cable.

As will become apparent, the present invention provides a static line retrieval apparatus which overcomes the problem of anchor cable kinking which adversely effect prior art assemblies. At the same time, the inline spool attachment design of the present invention provides for smooth and quick retraction of one or more static lines as required.

DESCRIPTION OF THE INVENTION

The static line retrieval apparatus of the present invention eliminates spool overturn as well as anchor cable kinking by providing a novel apparatus including a retractor spool having winch cable attachment means effectively aligned with a center line through the anchor cable on which the retractor spool is slidably mounted.

In particular, the retrieval apparatus includes a retriever spool hving a pair of attachment members extending outwardly from opposite sides thereof. The attachment members include openings spaced from each other such that a straight line extending through the centers of the openings also passes through the anchor cable, and preferably through the center line of the anchor cable. A bridle cable is pivotally attached at opposite ends to each attachment member by conventional fastening means extending through each of the attachment member openings. An equalizer spool engages the bridle cable and is itself attached to a winch cable engaging a conventional winch assembly.

By carefully positioning the connection between each attachment member and the bridle cable so as to define a straight line passing through the center line of the anchor cable, it becomes possible to substantially eliminate forces tending to cause spool overturn. In effect, the winch cable creates a generally upwardly directed resistance force which acts on the anchor cable through the spool in a manner so as to resist a generally downward force imposed on the anchor cable by the static lines dangling therefrom, thereby preventing tne anchor cable from kinking.

BRIEF DESCRIPTION OF THE DRAWINGS

The present invention can be best understood with reference to the accompanying drawings, wherein:

FIG. 1 shows a schematic side view of a known static line retriever assembly contacting a pair of relatively heavy static lines;

FIG. 2 shows a similar side view of the known assembly of FIG. 1 with the retriever assembly overturned;

FIG. 3 shows a top view of a static line retriever assembly formed according to the present invention; and, FIG. 4 shows a side view of the retriever assembly of FIG. 3.

BEST MODE FOR CARRYING OUT THE PRESENT INVENTION

Referring to FIGS. 1 and 2, a previously known static line retrieval assembly is schematically drawn and generally identified by numeral 10. Retrieval assembly 10 includes a retrieval spool S slidably mounted on a common anchor cable AC. Also slidably mounted on anchor cable AC are a pair of separate static line attachment assemblies SL. While only two static line attachment assemblies are shown for purposes of explanation, it is understood that any number of separate static line attachment assemblies SL may be slidably mounted on anchor cable AC.

Mounted on and extending vertically above spool S is an attachment bracket B. Bracket B includes a pivotal connection P vertically offset from a center line CL of anchor cable AC a distance generally indicated by arrows X—X in FIG. 1. Attached to pivotal connection P is an end portion of a conventional winch cable WC. Winch cable WC includes an opposite end, not shown, which is preferably wrapped about a conventional winch assembly, also not shown for purposes of simplicity. At this point it is respectfully noted that a load force representing a summation of various force components, such as the weight of static line attachment assemblies SL and any possible drag forces acting on portions of the static lines dangling from the aircraft which may include personnel or equipment still attached to the static lines, generally acts in a vertically downward direction as indicated by arrow L in FIG. 1. The direction of load force is often, but not always, substantially perpendicular to the direction of the center line CL of an anchor cable AC secured within the aircraft.

During operation of known spool assembly 10, winch cable WC is selectively retracted in a generally parallel direction to the center line of anchor cable AC as indicated by the direction of arrow Y. This, in turn, causes attached bracket B and spool S to be drawn in the same direction along anchor cable AC. When spool S contacts the static line attachment assemblies SL, an interaction between the force generated by winch cable WC and the load of the static lines SL acting in the direction of arrow L tends to pivot spool S in a counterclockwise direction about pivotal connection P. As a result, the forward end portion of spool S is pressed in a vertically downward direction and the rear end portion of spool S is simultaneously lifted, thereby tending to overturn spool S as clearly shown in FIG. 2. As spool S overturns, it deforms anchor cable AC, creating kinks which adversely affect the movement of spool S.

An improved retrieval apparatus 20 which overcomes the types of problems discussed hereabove is schematically shown in top and side view in FIGS. 3 and 4, respectively. Retrieval apparatus 20 includes a retrieval spool 22 slidably mounted on an anchor cable AC. Retrieval spool 22 preferably is of cylindrical configuration and includes a central opening 24 extending along a longitudinal axis of retrieval spool 22. Central opening 24 preferably has a diameter slightly larger than a diameter of anchor cable AC, allowing spool 22 to freely slide along anchor cable AC in a manner to be explained. While spool 22 is preferably of cylindrical configuration, it is noted that spool 22 can have almost any geometrical configuration from rectangular to circular.

Retrieval spool 22 includes forward and rear end surfaces 26 and 28, respectively, with at least forward end surface 26 extending in a direction substantially perpendicular to anchor cable AC when spool 22 is mounted thereon. Retrieval spool 22 further includes attachment means for engaging an end portion of a winch cable generally designated WC. In particular, a pair of lug-shaped attachment members 30 and 40 are mounted on and extend from opposite sides of spool 22. Lug-shaped attachment member 30 includes a base portion 32 engaging a side of retriever spool 22, with lug-shaped attachment member 40 also including a base portion 42 engaging an opposite of retriever spool 22 from base portion 32. Each base portion 32 and 42 may be fastened to spool 22 via conventional fastening means, such as fastening screws, pins, welding or the like. Alternatively, base portions 32 and 42 may integrally join retriever spool 22.

Lug-shaped attachment members 30 and 40 further include intermediate portions 34 and 44, respectively. Intermediate portions 34 and 44 engage base portions 32 and 42, respectively, and extend outward from spool 22 as the distances from their respective base portions increase. As a result, the distance between portions 34 and 44 increases in a linear fashion as the distance from base portion 32 and 42 increases. Each lug-shaped attachment member 30 and 40 further includes a forward portion 36 and 46, respectively, with each forward portion integrally joining a respective intermediate portion 34 and 44. Forward end portions 36 and 46 extend substantially parallel to one another on opposite sides of anchor cable AC, with each forward portion preferably having a substantially triangular configuration.

The attachment means joining winch cable WC to retrieval spool 22 further includes a bridle cable BC having connection assemblies 50 and 52 mounted on either end thereof. Each connection assembly 50 and 52 includes a pair of parallel extending flanges 51$a$, 51$b$ and 53$a$, 53$b$, respectively, with flanges 51$a$, 51$b$ positioned on opposite sides of forward portion 36 and flanges 53$a$ and 53$b$ positioned on opposite sides of forward portion 46. Flanges 51$a$ and 51$b$ are pivotally connected to forward end 36 by a connecting pin 56 inserted through aligned apertures extending through flanges 51$a$, 51$b$ and forward portion 36, respectively. In a like manner, a connecting pin 58 is inserted through a plurality of aligned apertures extending through flanges 53$a$, 53$b$ and forward portion 46, respectively. For reasons which will soon become clear, attachment members 30 and 40 are positioned such that the openings through forward portions 36 and 46 have centers which define a straight line I passing through anchor cable AC and preferably through the center line of anchor cable AC. The forward end portions 36 and 46 are preferably positioned such that line I extends substantially perpendicular to the center line of anchor cable AC.

Bridle cable BC partially encircles an equalizer spool 60, with equalizer spool 60 rotatably mounted on a shaft extending between a pair of flanges 62 and 64. Flanges 62 and 64, in turn, join one end of a connection assembly 66, with winch cable WC joining an opposite end of connection assembly 66.

Also slidably mounted on anchor cable AC are a pair of static line attachment assemblies 70 and 72, respectively. Each attachment assembly 70 and 72 is connected to a separate static line $SL_1$ and $SL_2$, respectively. While only two static line attachment assemblies are shown, it is understood that any number of static line attachment assemblies may be slidably mounted on anchor cable AC.

It is respectfully noted that when the forward end surface 26 of retriever spool 22 contacts attachment assembly 70, the line I extending between the centers of the openings formed through portions 36 and 46 is positioned more closely to winch cable WC than is attachment member 70. In other words, static line attachment members 70 are between the pivotal connections between bridle cable BC and lug-shaped attachment members 30 and 40 and the forward end surface 26 of spool 22. This means that the points of connection between spool 22 and bridle cable BC are forward of the resulting load force L generated by the combined weight and drag of the abutting static line attachment members 70 and 72.

The present invention is designed so that spool 22 contacts and pushes the static line attachment members 70 and 72 toward their retracted positions as spool 22 is drawn along anchor line AC by winch cable WC. Therefore, it is assumed that spool 22 tends to push attachment members 70 and 72 in the direction of arrow Z in FIGS. 3 and 4. However, it is also considered within the scope of the present invention to mount spool 22 on the opposite side of attachment members 70 and 72, with spool 22 functioning to slide the attachment members in a direction opposite to arrow Z.

During operation of the embodiment of FIGS. 3 and 4, winch cable WC is selectively pulled in a direction parallel to arrow Z, resulting in equalizer spool 6, bridle cable BC and the lug-shaped attachment members 30 and 40 pivotally attached thereto being drawn in the direction of arrow Z. Because spool 22 is attached to lug-shaped attachment members 30 and 40, spool 22 is also drawn in the direction of arrow Z. Spool 22 easily slides along anchor cable AC, at least until contacting static line attachment member 70. After contacting attachment member 70, additional movement of spool 22 in the direction of arrow Z acts to push or slide attachment member 70 along anchor cable AC, with attachment member 70 eventually abutting attachment 72 as shown in FIGS. 3 and 4. Additional movement of spool 22 results in sliding movement of the abutting attachment members 70 and 72 in the direction of arrow Z toward their respective retracted positions.

Because the connection points between bridle cable BC and attachment members 30 and 40 define a line intersecting the center line of anchor cable AC, any pulling force generated by winch cable WC will not result in longitudinal pivoting movement of spool 22. Furthermore, because the line intersecting the connection points is forward of the load generated by the static line attachment members, load induced anchor line kink is resisted by the winch cable pulling force. This holds true even if the winch cable WC is inclined relative to anchor cable AC. As a result, winch cable WC draws spool 22 in the direction of arrow Z, with spool 22 abutting and pushing static line attachment members 70 and 72 toward their retracted positions.

The present invention is not intended to be limited to the above disclosed embodiments, rather, the invention is intended to be limited only by the scope of the claims following hereafter.

What is claimed is:

1. Winch cable driven retrieval apparatus for retracting static lines slidably mounted on a fixed anchor cable or the like, comprising:
   a retrieval member having an opening extending completely therethrough of a diameter sufficient to insert an anchor cable completely through said retrieval member, said retrieval member further including a front end surface adapted to confront at least one static line attachment member slidably mounted on said anchor cable;
   a pair of attachment members extending from oppositely disposed side portions of said retrieval member, said attachment members including spaced forward end portions positioned on opposite sides of said anchor cable and located along an imaginary line which passes through said anchor cable;
   coupling means joining a winch cable assembly with each forward end portion for smoothly drawing said retrieval member along said anchor cable toward a retracted position responsive to selective retraction of said winch cable;
   whereby said retrieval member contacts and slides said at least one static line attachment member toward said retracted position while inherently resisting the formation of kinks in said anchor cable and keeping friction to a minimum.

2. A retrieval apparatus according to claim 1, wherein said retrieval member has a tubular, spool-like configuration and includes a substantially cylindrical outer surface.

3. Winch cable drive retrieval apparatus for retracting static lines slidably mounted on a fixed anchor cable or the like, and comprising:
   a retrieval member having an opening extending completely therethrough of a diameter sufficient to insert an anchor cable completely through said retrieval member, said retrieval member further including a front end surface confronting at least one static line attachment member slidably mounted on said anchor cable;
   a pair of attachment members extending from oppositely disposed side portions of said retrieval member, said attachment members including spaced forward end portions positioned on opposite ends of an imaginary line extending through said anchor cable, each attachment member includes a base portion fixedly attached to said retrieval member and an intermediate portion extending between a base portion and a respective forward end portion;
   coupling means joining a winch cable assembly with each forward end portion for smoothly drawing said retrieval member along said anchor cable toward a retracted position responsive to selective retraction of said winch cable;
   whereby said retrieval member contacts and slides said at least one static line attachment member toward said retracted position while inherently resisting the formation of kinks in said anchor cable.

4. A retrieval apparatus according to claim 3, wherein the linear distance between said intermediate portions uniformly increases as said intermediate portions approach their respective forward end portions.

5. A retrieval apparatus according to claim 1, wherein each forward end portion includes a through opening positioned such that said imaginary line extends between the centers of said respective openings and intersects the centerline of said anchor cable.

6. A retrieval apparatus according to claim 5, wherein each opening is further positioned such that said imaginary line joining the centers of said openings extends substantially perpendicular to the centerline of said anchor cable, with the imaginary line spaced a distance beyond the front end surface of said retrieval member.

7. A retrieval apparatus according to claim 5, wherein said coupling means comprises a spindle rotatably attached to an end portion of said winch cable and a bridle cable partially encircling said spindle, said bridle cable including a pair of end portions each positioned adjacent a separate forward end portion of a respective attachment member.

8. A retrieval apparatus according to claim 7, wherein engagement means are arranged for pivotally joining each end portion of said bridle cable to a forward end portion of a respective attachment member.

9. A retrieval apparatus according to claim 8, wherein said engagement means comprises a separate pair of aligned flanges attached to each end portion of said bridle cable, with each pair of aligned flanges extending on opposite sides of a respective forward end portion;

said engagement means further comprises a separate pin extending between each pair of flanges and passing through the opening in said forward end portion positioned between said pair of flanges.

* * * * *